US007064721B2

(12) United States Patent
Zafar et al.

(10) Patent No.: US 7,064,721 B2
(45) Date of Patent: Jun. 20, 2006

(54) MOBILE SATELLITE RADIO ANTENNA SYSTEM

(75) Inventors: Imtiaz Zafar, Sterling Heights, MI (US); Ahmad B. Pakray, Rochester Hills, MI (US); Kenneth P. Lee, Bingham Farms, MI (US); J. Robert Dockemeyer, Jr., Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/607,661

(22) Filed: Jun. 27, 2003

(65) Prior Publication Data

US 2004/0263403 A1 Dec. 30, 2004

(51) Int. Cl.
*H04Q 21/00* (2006.01)
*H04Q 7/20* (2006.01)

(52) U.S. Cl. ..................................... 343/725; 455/13.3

(58) Field of Classification Search ................ 343/713, 343/797, 725; 455/3.02, 3.04, 344, 557, 455/566, 13.3
See application file for complete search history.

(56) References Cited

U.S. PATENT DOCUMENTS

| | | | | |
|---|---|---|---|---|
| 6,331,838 | B1 | 12/2001 | Scott et al. | 343/700 MS |
| 6,441,792 | B1 * | 8/2002 | Sievenpiper et al. | 343/713 |
| 6,538,609 | B1 * | 3/2003 | Nguyen et al. | 343/713 |
| 6,633,258 | B1 * | 10/2003 | Lindenmeier et al. | 342/374 |
| 6,768,457 | B1 * | 7/2004 | Lindenmeier | 342/374 |
| 6,806,838 | B1 * | 10/2004 | Petros et al. | 343/725 |
| 6,819,288 | B1 * | 11/2004 | Truthan | 343/700 MS |
| 2002/0008667 | A1 * | 1/2002 | Nguyen et al. | 343/715 |
| 2002/0196183 | A1 | 12/2002 | Heinz | 343/713 |
| 2003/0164802 | A1 * | 9/2003 | Lindenmeier | 343/713 |

FOREIGN PATENT DOCUMENTS

| | | |
|---|---|---|
| DE | 202 02 334 | 6/2002 |
| GB | 2 380 325 | 4/2003 |
| WO | 96/099941 | 4/1996 |

OTHER PUBLICATIONS

European Search Report dated Mar. 24, 2005.

(Continued)

*Primary Examiner*—Don Wong
*Assistant Examiner*—Minh Dieu A
(74) *Attorney, Agent, or Firm*—Stefan V. Chmielewski

(57) ABSTRACT

An antenna system is disclosed. The antenna system includes at least one first and second antenna. The at least one first antenna is located about a first portion of a mobile structure and is capable of receiving satellite and terrestrial re-transmitted satellite signals. The at least one second antenna is located about a second portion of a mobile structure and is capable of receiving satellite and terrestrial re-transmitted satellite signals. Either the at least one first or second antenna receives the satellite and terrestrial re-transmitted satellite signals and the other of the at least one first or second antenna becomes operative when the satellite and terrestrial re-transmitted satellite signals being received by the at least one first or second antenna is obstructed. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

18 Claims, 5 Drawing Sheets

OTHER PUBLICATIONS

European Search Report dated Aug. 4, 2005.

Patsiokas, S.J.: "XM Satellite Radio Technology Fundamentals", SAE Technical Paper Series, Society of Engineers, Warrendale, PA, US, vol. 1-1328, Mar. 5, 2001, pp. 1-6.

Lindenmaier, H. et al.: "Low profile SDARS—antenna with diversity functionality" IEEE Antennas And Propagation Society International Symposium. 2002 Digest. APS. San Antonio, TX, Jun. 16-21, 2002, New York, NY, IEEE, US, vol. 1 of 4,pp. 744-747.

* cited by examiner

MOBILE SATELLITE RADIO ANTENNA SYSTEM

TECHNICAL FIELD

The invention relates generally to radio antennas. More particularly, the invention relates to antenna reception of satellite and terrestrial re-transmitted satellite signals for mobile structures that include two or more antennas for mounting internally or externally on the mobile structure.

BACKGROUND OF THE INVENTION

With reference to FIGS. 1 and 2, a number of antenna systems have been proposed which provide for the reception of satellite transmission signals, S (FIG. 2), from a satellite 11, such as transmission signals for satellite digital audio radio service (SDARS), on mobile structures, such as an automotive vehicle, V. SDARS, for example, operates on the S-band frequencies ranging between 2320–2345 MHz. FIG. 1 illustrates a known after-market antenna system 1*a* that allows transfer of radio frequency (RF) energy across a dielectric, such as glass 3*a*, for reception of the satellite transmitted signals, S. The antenna system 1*a* provides for the transfer of RF energy through the glass 3*a* or other dielectric surfaces to avoid the undesirable procedure of having to drill holes, for example, through the windshield or window of a vehicle, V, for installation. Although adequate for most applications, after-market glass-mount antenna systems have been considered advantageous because they obviate the necessity of having to provide a proper seal around an installation hole or other window opening to protect the interior of the vehicle, V, and its occupants from exposure to external weather conditions.

In the known antenna system 1*a* depicted in FIG. 1, RF signals from an antenna 2*a* are conducted across the glass surface 3*a* via a coupling device 4*a* that typically employs capacitive coupling, slot coupling or aperture coupling. The portion of the coupling device 4*a* on the interior of the vehicle, V, is connected to a matching circuit 5*a* which provides the RF signals to a low noise amplifier (LNA) 7*a* at the input of a receiver 8*a* via an RF or coaxial cable 6*a*.

FIG. 2 illustrates an alternative embodiment of the antenna system 1*a* of FIG. 1, except that antenna system 1*b* in FIG. 2 includes an antenna 2*b*, which may range in height from approximately 35–80 mm, that has been displaced to the roof of the vehicle, V, and is retained by a magnet or other securing means (not shown). Through cable 3*b*, the RF signal travels to the coupler 4*b*, which is mounted exteriorly on the vehicle's glass (e.g., back windshield), and to second coupler 4*b*, which is mounted on the glass, such that the second coupler 4*b* is positioned on the interior of the vehicle, V, in a directly opposing relationship to the first coupler 4*b* mounted on the exterior of the glass. The RF signal then travels through RF cable 5*b* to LNA 6*b* and then through RF cable 7*b* to receiver 8*b*. Known coupling devices that are similar to the coupler 4*b* may include other performance enhancements, such as an integrated receiver unit that minimizes cable runs so as to minimize coupler losses.

Both types of antenna mounting systems 1*a*, 1*b* illustrated in FIGS. 1 and 2 suffer from various deficiencies. First, the antennas 2*a*, 2*b* of FIGS. 1 and 2, respectively, is, in all likelihood, a second or even third antenna positioned on the vehicle (i.e. an additional antenna in view of the original equipment manufacture (OEM)-installed AM/FM antenna), and thus adds an unsightly appearance to the vehicle, V. Regarding the window mount antenna system 1*a*, RF coupling loss through the glass 3*a* is generally 1 dB or higher. This causes an increase in noise that results in degradation of receiver sensitivity. Even further, the couplers 4*a* may obstruct vehicle operator vision while also generally making the appearance of the vehicle, V, unsightly.

The vehicle body mount (i.e. roof mount) antenna system 1*b* includes other maintenance, safety, and performance issues. For example, the installation of antenna 2*b* is located remotely with respect to LNA 6*b* and radio receiver 8*b*, which is generally considered unattractive to consumers of mobile satellite services, such as SDARS. This is true for several reasons. First, the roof mounted antenna 2*b* is unsightly, not only to the external observer, but also to the vehicle occupants where the RF cables 5*b*, 7*b* must be routed through the interior of the vehicle, V. Secondly, as a result of height restrictions on car carriers, truck carriers, or other vehicle carriers, an antenna 2*b* placed on the roof has to be below some maximum height, such that the overall vehicle height does not exceed the maximum allowable height whereby this causes a problem with being loaded on a carrier loaded on a carrier.

Thirdly, RF transmissions are often subject to multi-path fading. This is especially true of satellite transmitted signals, S. Signal blockages, or obstructed satellite signals, O (FIG. 2), at the antenna can occur due to physical obstructions between a transmitter (e.g. the orbiting satellite 11) and the receiver (e.g. the antenna 2*b* on the vehicle, V), which undesirably results in service outages. For example, as illustrated in FIG. 2, the physical obstructions that the antenna 2*b* typically encounters may be tall buildings, B, or trees, T, that impede line of sight (LOS) of the antenna 2*b*. In this scenario, SDARS service outages may occur when noise or multi-path signal reflections are sufficiently high with respect to the reception of the desired signal, S.

A need therefore exists for a vehicle antenna system that provides an effective means for reception of satellite transmitted signals while reducing maintenance issues and increasing signal performance. A need also exists for a vehicle antenna system that prevents additional holes from being drilled in a vehicle's exterior shell. Even further, a need also exists for a vehicle antenna system that eliminates the need to position a relatively large, unsightly antenna on the roof of a vehicle. Yet even further, a need also exists for a vehicle antenna system that eliminates the need to locate a magnetically mounted antenna on the roof or glass of a vehicle, or to use antenna couplers on the glass of a vehicle.

SUMMARY OF THE INVENTION

The present invention relates to an antenna system for a vehicle. Accordingly, one embodiment of the invention is directed to an antenna system that includes at least one first and second antenna. The at least one first antenna is located about a first portion of a mobile structure and is capable of receiving satellite and terrestrial re-transmitted satellite signals. The at least one second antenna is located about a second portion of a mobile structure and is capable of receiving satellite and terrestrial re-transmitted satellite signals. The at least one first and second antenna receive the satellite and terrestrial re-transmitted satellite signals. Signal reception on the mobile structure is maintained by switching and/or combining the satellite and terrestrial re-transmitted satellite signals received by the at least one first and second antennas when the satellite and terrestrial re-transmitted satellite signals being received by the at least one first or second antenna is obstructed.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
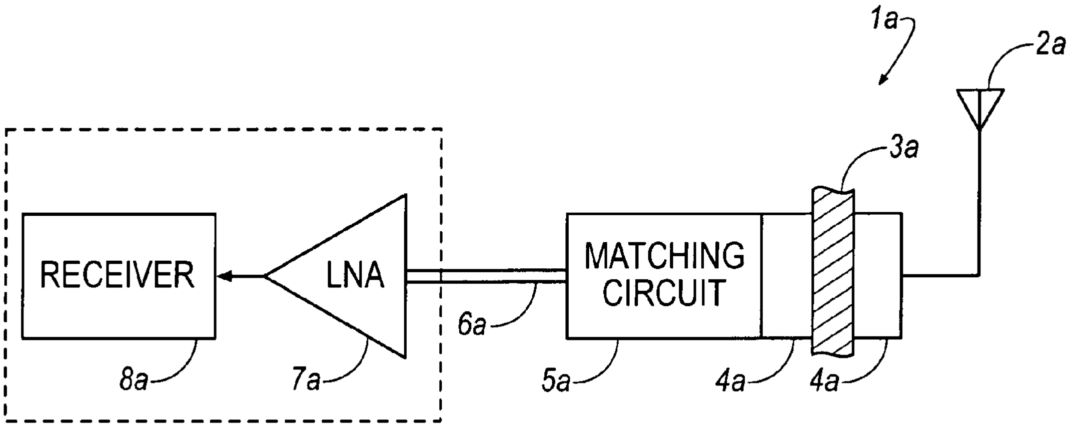
FIG. 1 (PRIOR ART)
FIG. 1 illustrates a known antenna system that allows inductive transfer of RF energy across a dielectric such as glass for reception of satellite transmitted signals.
Figure 2:
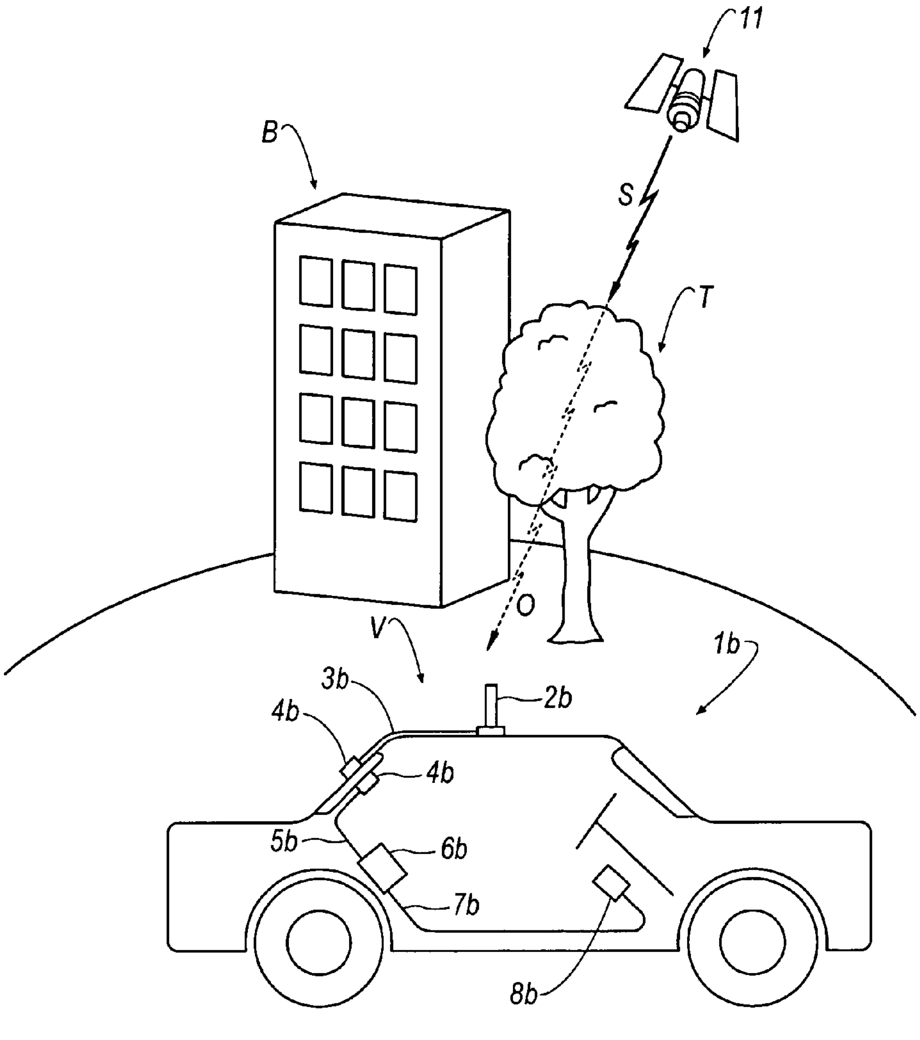
FIG. 2 (PRIOR ART)
FIG. 2 illustrates an alternative known embodiment of the antenna system of FIG. 1 mounted on a vehicle.
Figure 3:
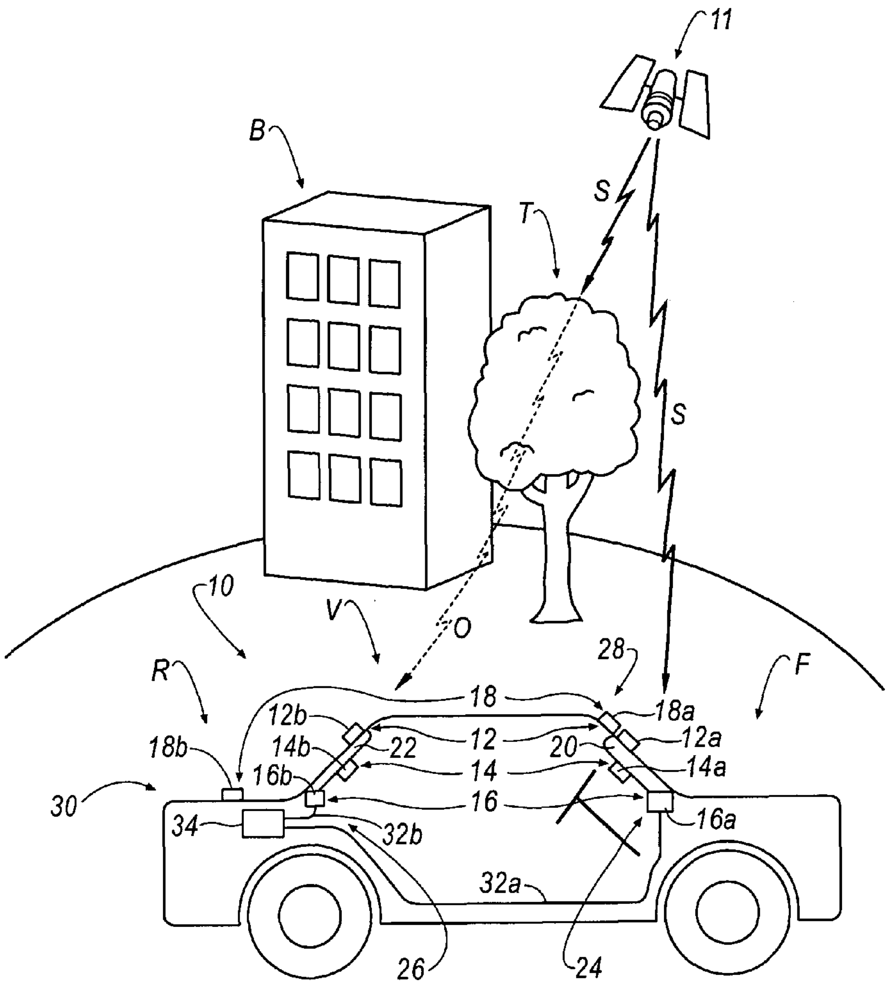
FIG. 3 illustrates a vehicle including a vehicle antenna system for reception of satellite and terrestrial re-transmitted satellite signals according to an embodiment of the present invention.

The above described disadvantages relating to FIGS. 1 and 2 are overcome and a number of advantages are realized by the antenna system, which is shown generally at 10 in FIG. 3. As explained below, the antenna system 10 operates using two or more complementary antennas to cover the expected satellite signal, S, from one or more satellites 11 placed in synchronous or non-synchronous earth orbits. Satellite transmissions may be used for audio programming, but can be used for other purposes as well. Accordingly, the antenna system 10 is designed to increase the probability of uninterrupted reception of the signal, S, when physical obstructions, such as tall buildings, B, or trees, T, impede the LOS of at least one of the antennas, which results in an obstructed satellite signal, O. As illustrated, if the vehicle, V, includes at least one antenna positioned at the rear, R, where signal shadowing may occur (i.e. the signal, S, is obstructed), and at least one antenna positioned at the front, F, of the vehicle, V, where the signal, S, is seen by the antenna system 10. Thus, the fact that the signal, S, is received at the front, F, or because the signal, S, received at the front, F, is stronger than the obstructed signal, O, consistently uninterrupted operation of the antenna system 10 is more likely to be ensured.

Essentially, the antennas are strategically located in the vehicle, V, in a fashion such that the antennas are looking up toward the satellite 11. For example, in SDARS applications, the antenna typically looks up at the satellite 11 at a minimum angle of approximately 20° for satellite signal reception while seeking terrestrial re-transmitted satellite signals that are re-broadcast by a repeater at an angle approximately equal to 0°. Accordingly, it is preferable to position the antenna relating to the antenna system 10 above the terrestrial transmission horizon such that any metallic obstructions on the vehicle, V, do not create signal loss.

As illustrated, the antenna system 10 comprises at least two or more antennas 12*a*, 12*b*, 14*a*, 14*b*, 16*a*, 16*b*, 18*a*, 18*b* mounted internally or externally on the surface of a mobile structure, such as a vehicle, V, for reception of satellite and terrestrial re-transmitted satellite signals, S. The antenna system 10 comprises at least two antennas, which may correlate to antenna pairs 12, 14, 16, and 18. Although the antennas 12*a*, 12*b*, 14*a*, 14*b*, 16*a*, 16*b*, 18*a*, 18*b* correlate to the antenna pairs 12, 14, 16, and 18, the antenna system 10 does not necessarily operate in pairs; it is contemplated that any desirable amount of antennas may be employed, such as, for example, two, three, four, five or more antennas to achieve the desired signal reception for maximized output performance.

As illustrated, each antenna pair 12, 14, 16, 18 is positioned in a generally symmetrical pattern at the front, F, or rear, R, about the vehicle, V, such that the antennas are mounted within or exteriorly on the vehicle, V. Although not required, it is preferable to locate the antennas at the opposing front, F, and rear, R, portions of the vehicle, V; however, a pair of complementary antennas may be located in a single housing or package (not shown) because the minimum distance the antennas may be separated by is at least one ¼ wavelength, which may be a very nominal distance in view of higher SDARS-type frequencies. In particular, this applies to a terrestrial signal application such that two antennas of the same polarization may be spaced at least ¼ wavelength apart, or two antennas of opposite polarization (i.e. vertically polarized and horizontally polarized antennas) may be placed in the same location. As illustrated, the antennas 12*a*, 14*a*, 16*a*, 18*a*, (i.e. "the antennas") are located at the front, F, of the vehicle, V, and the antennas 12*b*, 14*b*, 16*b*, 18*b* (i.e. "the b antennas") are located at a rear, R, of the vehicle, V. Even further, although the antennas pairs 12, 14, 16, 18 are shown to be positioned in a generally symmetrical pattern about the vehicle, V, the antennas 12*a*, 12*b*, 14*a*, 14*b*, 16*a*, 16*b*, 18*a*, 18*b* may be positioned at any desirable location on the vehicle, V, in any non-symmetric pattern, if desired.

Although the antennas 12*a*, 12*b*, 14*a*, 14*b*, 16*a*, 16*b*, 18*a*, 18*b* generally correlate to antenna pairs 12, 14, 16, 18, respectively, the antennas 12*a*, 12*b*, 14*a*, 14*b*, 16*a*, 16*b*, 18*a*, 18*b* do not necessarily operate exclusively within the designated antenna pair (e.g. antenna 12*a* does not necessarily operate exclusively with antenna 12*b*). In one embodiment of the invention, the antenna 12*a*, which is positioned on the exterior of windshield glass 20, may operate in concert with the antenna 14*b*, which is positioned within the vehicle, V, on the rear windshield glass 22. Another embodiment of the invention may include an antenna system 10 comprising an antenna configuration that includes any one of antennas 12*a*, 12*b*, 14*a*, or 14*b* positioned within (e.g. one of the antennas from antenna pair 14) or on the exterior (e.g. one of the antennas from antenna pair 12) of one of the glass portions 20, 22 that operates in concert with the antenna 16*a* positioned on the instrument panel 24 or antenna 16*b* positioned on the rear package shelf 26 within the vehicle. Another embodiment of the invention may be directed to an antenna system 10 that includes antenna 18*a* or 18*b* positioned on an exterior shell of the vehicle, such as an outer glass frame portion 28 or fender 30 with any one of the antennas 12*a*, 12*b*, 14*a*, 14*b* positioned on the interior or exterior of the glass 20, 22 or antennas 16*a*, 16*b* positioned on an instrument panel 24 or package shelf 26. Thus, it is contemplated that the antennas comprising the antenna system 10 may include at least two antennas that are located on any portion of the vehicle, V, such as the glass 20, 22, an instrument panel 24, rear package shelf 26, the exterior shell 28, 30, or any other desirable location such that the antennas are positioned exteriorly on the vehicle, V, or within the vehicle, V.

Once the antennas 12*a*, 12*b*, 14*a*, 14*b*, 16*a*, 16*b*, 18*a*, 18*b* are positioned, an SDARS-satellite cable and/or an SDARS-terrestrial cable, which is generally shown at 32*a* for the front, F, of the vehicle, V, and at 32*b*, for the rear, R, of the vehicle, V, extends toward a receiver 34 from the respective antennas 12*a*, 14*a*, 16*a*, 18*a* positioned at the front, F, and antennas 12*b*, 14*b*, 16*b*, 18*b* positioned at the rear, R. As explained above, any desirable number of antennas 12*a*, 12*b*, 14*a*, 14*b*, 16*a*, 16*b*, 18*a*, 18*b* may be implemented in the vehicle in any desired configuration or pattern; therefore, for illustrative purposes, only one cable 32*a* is shown extending from the antenna 16*a* and one cable 32*b* is shown extending from the antenna 16*b*. However, it is contemplated that multiple cables 32*a*, 32*b* may be spliced or individually extend from multiple antennas positioned at the front, F, or rear, R, of the vehicle, V, for implementations including more than two antennas.

It is preferable to locate the receiver 34 as close to the antenna elements as possible such that losses in the cables 32*a*, 32*b* are kept to a minimum. In some implementations, it may not be possible to centrally locate the receiver 34 in the vehicle, V, such that both cables 32*a*, 32*b* have the same lengths and thus, the same losses. As illustrated, the receiver 34 is positioned about the rear, R, of the vehicle, V, such that the cable 32*a* is much longer than the cable 32*b* (i.e. the cable 32*a* has greater signal loss than the cable 32*b*). Essentially, in this embodiment of the invention, an LNA 104 (FIGS. 4A–4D) may be associated with the antennas located on the front, F, of the vehicle, V, and the antenna located on the rear, R, of the vehicle, V, may not include an LNA 104 due to the fact that the losses in the cable 32*b* are not substantial enough to warrant an amplification. Hence, it is possible to implement an antenna system that includes both passive and active antenna units.

The antennas 12*a*, 12*b*, 14*a*, 14*b*, 16*a*, 16*b*, 18*a*, 18*b*, which are hereinafter referred to as antennas 12*a*–18*b*, may be considered low-profile, multi-band terrestrial/satellite antennas. It is preferable that the antennas 12*a*–18*b* include a structure that minimizes the overall height (i.e. include a 'low-profile') of the antenna such that the antenna is essentially transparent to vehicle occupants and observers and not very noticeable. It is contemplated that 'low-profile' antennas may be defined to include any antenna height less than or equal to 20 mm. Although it is preferable to minimize the height of the antennas 12*a*–18*b*, the antenna height may extend past what is considered to be 'low profile,' as designated above, such that the antennas 12*a*–18*b* are positioned according to the antenna system 10, as explained above with respect to FIG. 3.

Figure 4A:
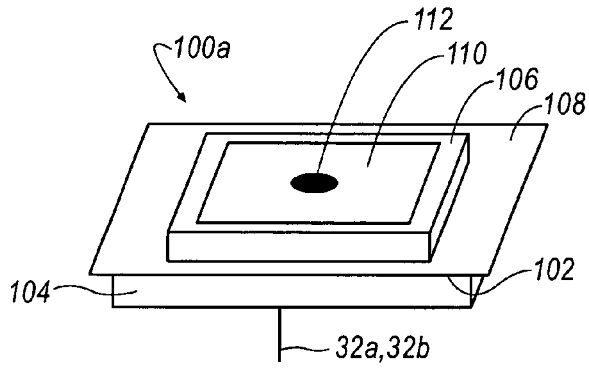
FIGS. 4A–4E illustrates antennas that may be used in a combined multi-band terrestrial/satellite antenna according to the vehicle antenna system illustrated in FIG. 3.
Figure 4B:
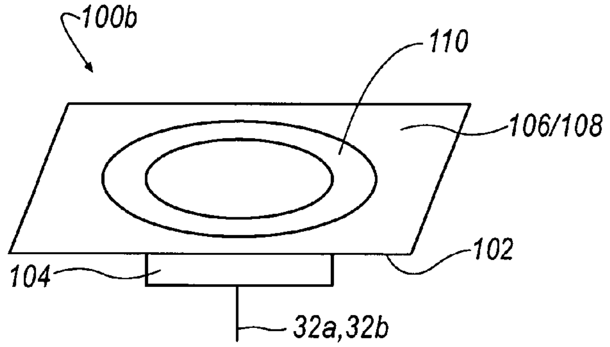
Figure 4C:
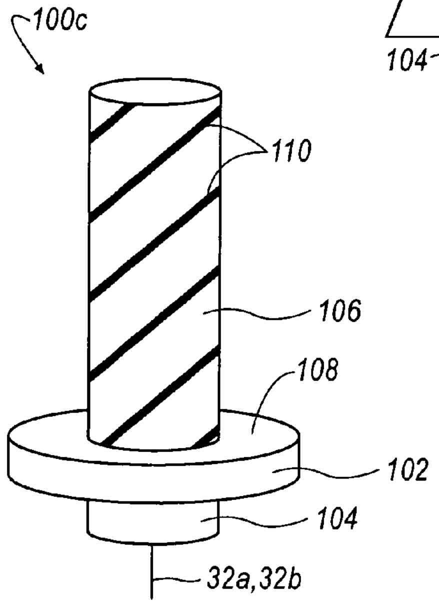
Figure 4D:
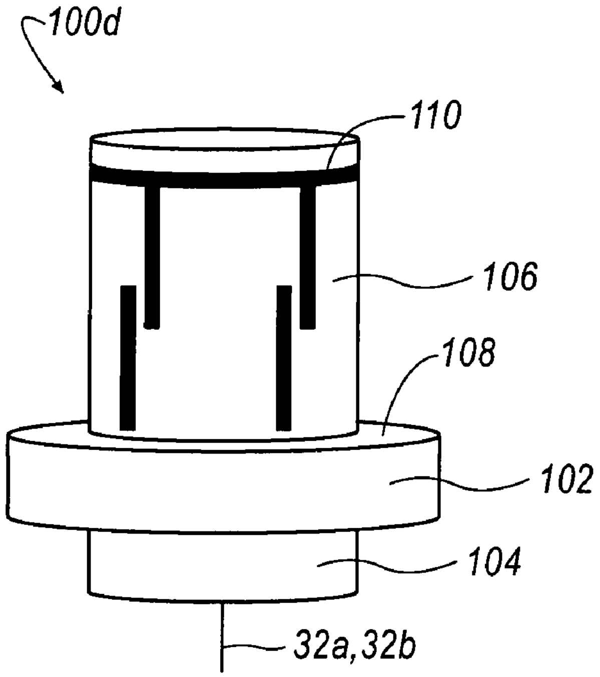

Four possible embodiments of the multi-band terrestrial/satellite antennas 12*a*–18*b* that may be applied in the antenna system 10 are illustrated in FIGS. 4A–4D. The antennas 12*a*–18*b* implemented in the antenna system 10 may be a patch antenna 100*a* (FIG. 4A), a loop antenna 100*b* (FIG. 4B), a quadrifilar antenna 100*c* (FIG. 4C), or a coupled-loop antenna 100*d* (FIG. 4D). As illustrated, each antenna 100*a*–100*d* may be coupled to a structural element, such as a circuit board 102 or substrate 106, and an LNA 104. Each antenna 100*a*–100*d* may include a weatherproofing material (not shown) that may be applied to its exterior surface for protection against the deteriorating effects of rain, sunshine, etc. Additionally, a binding agent (not shown) may be applied to the interior surface of the antennas 100*a*–100*d* when fabricated into the final form as shown in FIGS. 4A–4D.

Referring specifically to FIG. 4A, the patch antenna 100*a* may also include a ground plane 108 positioned under the substrate 106, and a conductive area 110 positioned over the substrate 106, which includes a feed point 112. The feed point 112 receives a pin (not shown) that extends through the LNA 104 for assembly and electrical communication purposes, which is subsequently soldered for directly connecting the antenna assembly. If any of the antennas 100*a*–100*d* are positioned on glass 20, 22, a conductive adhesive may be applied to a surface of the antenna 100*a*–100*d* to permit attachment thereto. Even further, if any of the antennas 100*a*–100*d* are secured to the instrument panel 24 or package shelf 26, the antenna 100*a*–100*d* may include a bezel, nut, and bolt, and LNA housing (not shown). Yet even further, if any of the antennas 100*a*–100*d* are secured to the outer glass frame portion 28 or fender 30, the antenna may also be secured via the bezel, nut, and bolt, and LNA housing combination about an OEM supplied passage for an AM/FM antenna (not shown).

Referring now to FIG. 4B, the loop antenna 100*b* also includes a generally planar substrate 106/ground plane 108, and a generally circular or oval conductive area 110. As illustrated, the circuit board 102, may act not only as a planar substrate 106, but also as a ground plane 108. FIGS. 4C and 4D illustrate alternative embodiments of the loop antenna 100*b*, such that the conductive element 110 is wrapped or disposed upon a generally tubular or cylindrical substrate 106 that is positioned over the ground plane 108. As seen in FIG. 4C, the conductive element 110 is essentially a loop that is wrapped in a helical pattern about the cylindrical substrate 106. Alternatively, as seen in FIG. 4D, the conductive element 110 comprises at least one loop portion with conductive strips that extend in a generally perpendicular pattern from the loop. According to the illustrated embodiments of the antennas in FIGS. 4B and 4C, the antennas 100*b* and 100*c* may be directly coupled to the LNA 104 via a soldering technique that includes a feed point at, on, or about the conductive element 110, as described above. Alternatively, the conductive elements 110 of the antenna 100*d* illustrated in FIG. 4D are parasitic elements and are parasitically coupled with respect to the LNA 104.

It is known that antenna impedance is referenced from the ground; therefore, it is preferable to introduce the ground plane 108 in the design of the antennas 100*a*–100*d* to avoid undesirable ripple to obtain a smooth polar response. It is preferable to maintain a minimum ground plane 108 of approximately 100 sq-mm or 100 mm-diameter regardless of antenna position. If the antenna is located on the glass 20, 22, then ground plane 108 may be introduced without any structural alterations to the antenna; however, if the antenna is located on the front or rear dash 24, 26, the ground plane 108 is not effected because a ground plane already exists on the front or rear dash 24, 26. Referring to FIG. 4A, the dielectric dimensions, dielectric constant, and dimensions of the conductive patch element 110 and the ground plane 108 determine the operating characteristics of the patch antenna 100*a*. According to one embodiment of the invention, the patch antenna 100*a* may be defined to include an approximate surface area of 1 square inch and height of approximately 4 mm to 6 mm. The conductive patch element 110 may be approximately 0.5 square inches. Referring to FIG. 4B, the loop or micro-strip antenna 100*b* may be etched on a low-loss dielectric. The loop antenna 100*b* operates in the TM21 mode and yields adequate performance for elevation angles approximately equal to 20 to 60 degrees and degraded performance at higher angles such as 70 to 90 degrees.

Figure 4E:
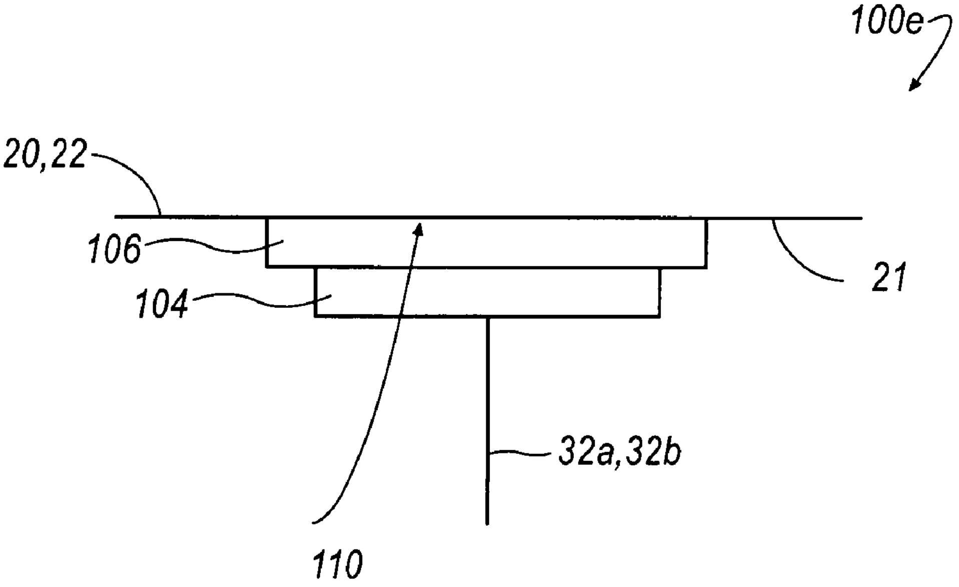

Referring now to FIG. 4C, the diameter, height, and pitch angle of helical conductive elements 110 determine the operating characteristics of the quadrifilar antenna 100*c*. According to one embodiment of the invention, the quadrifilar antenna 100*c* may include a diameter approximately equal to 20 mm and a height ranging from 6.0 cm to 6.5 cm. Referring now to FIG. 4D, the ground plane 108, diameter, and length of the conductive elements 110 determine the operating characteristics of the coupled loop antenna 10*d*. According to one embodiment of the invention, the loop perimeter length may be approximately ½ wavelength and the height may be approximately equal to 30 mm. Referring now to FIG. 4E, an antenna according to another embodiment of the invention, which is seen generally at 100*e*, is a printed glass antenna. As illustrated, the printed glass antenna 100*e* comprises a conductive element 110 printed on an inner surface of the front, rear, or side glass 20, 22 of the vehicle, V, with a thin layer of film 106 disposed over the conductive element 110 on the inner portion 21 of the glass 20, 22. The LNA 104 is attached to the opposing side of the film layer 106.

Although not illustrated, it is contemplated that any desired antenna may be implemented in the design of the antenna system 10. For example, the antennas 12*a*–18*b* may include a patch antenna incorporating a plurality of micro-strips that have a specific impedance when placed on the glass, which is similar to the printed glass antenna illustrated in FIG. 4E, except for the fact that that the micro-strip patch antenna is pre-tuned by the manufacturer prior to being located on the glass. Another alternative antenna that may be applied to the antenna system 10 may be a cross-dipole antenna to receive terrestrial signals that include AM/FM and SDARS signals. Essentially, the cross-dipole antenna may comprise two circuit boards each including a dipole that are crossed at a 90° angle. Feed points of the circuit boards may be varied in any desirable polarization such as a horizontal, vertical, left-hand, right-hand polarization, by varying tapping points 90°, 180°, or 270°.

As explained above, the antenna system enhances performance of the receiver by using at least a second antenna when a satellite signal is obstructed. Accordingly, there is a higher probability that the second antenna is not being obstructed, and therefore, the receiver would still be able to see the signal. Essentially, signal reception is maintained by switching and/or combining the satellite and terrestrial re-transmitted satellite signals received by the antennas. The switching and/or combining is determined by design-specific criteria used by the receiver, such as bit error rate, carrier to noise, or signal strength, or any other decision-based criteria algorithms. By introducing the second antenna, not only is performance improved, but other packaging, installation, and maintenance issues are overcome as well by locating discrete patch or loop-type antenna inside of, outside of, or about the vehicle. For example, because the antenna may be a low profile antenna, height restrictions on car carriers, truck carriers, or other vehicle carriers should not be an issue. Although discussion of the antenna system has focused on the particular application of a vehicle, V, it should be readily apparent to one skilled in the art, that the antenna system can be just as easily used in an aircraft, boat, train, mobile home, recreational vehicle or truck.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An antenna system, comprising:

at least one first antenna located on a first portion of a mobile structure that is capable of receiving satellite and terrestrial re-transmitted satellite signals;

and at least one second antenna located on a second portion of the mobile structure that is capable of receiving satellite and terrestrial re-transmitted satellite signals, wherein the at least one first and second antenna receive the satellite and terrestrial re-transmitted satellite signals, such that signal reception on the mobile structure is maintained by switching and/or combining the satellite and terrestrial re-transmitted satellite signals received by the at least one first and second antennas when the satellite and terrestrial re-transmitted satellite signals being received by the at least one first or second antenna is obstructed and, wherein the satellite and terrestrial re-transmitted satellite signals are SDARS frequencies ranging from 2320–2345 MHz.

2. The antenna system according to claim 1, wherein the at least one first and second antenna are located within the mobile structure.

3. The antenna system according to claim 1, wherein the at least one first and second antenna are located exteriorly on the mobile structure.

4. The antenna system according to claim 1, wherein the at least one first and second antenna are located within the mobile structure and exteriorly on the mobile structure.

5. The antenna system according to claim 1, wherein the mobile structure is an automotive vehicle, aircraft, boat, train, mobile home, recreational vehicle or truck.

6. The antenna system according to claim 5, wherein the first and second portions are opposingly located on a front end of the mobile structure and a rear end of the mobile structure.

7. The antenna system according to claim 6, wherein the at least one first and second antenna are located on front end interior glass or rear end interior glass.

8. The antenna system according to claim 7, wherein the at least one first and second antenna are located on front end exterior glass or rear end exterior glass.

9. The antenna system according to claim 8, wherein the glass is automotive windshield glass.

10. The antenna system according to claim 6, wherein the at least one first and second antenna are located on front end interior panel or rear end interior panel.

11. The antenna system according to claim 10, wherein the front end interior panel is an automotive dashboard or instrument panel and the rear end interior panel is an automotive rear deck panel.

12. The antenna system according to claim 6, wherein the at least one first and second antenna are located on front end exterior panel or rear end exterior panel.

13. The antenna system according to claim 12, wherein the front end exterior panel is an automotive front fender or glass frame and the rear end exterior panel is an automotive rear fender or glass frame.

14. The antenna system according to claim 1, wherein the at least one first and second antenna includes a circuit board, substrate, low noise amplifier, a ground plane, and a conductive area.

15. The antenna system according to claim 14, wherein the conductive area is a patch of material that defines a patch antenna.

16. The antenna system according to claim 14, wherein the conductive area is a loop of material that defines a loop antenna.

17. The antenna system according to claim 16, wherein the loop antenna further comprises parasitic elements that are parasitically coupled to the low noise amplifier to define a coupled-loop antenna.

18. The antenna system according to claim 16, wherein the loop material is helically would to define a quadrifilar antenna.

* * * * *